(12) United States Patent
Cho et al.

(10) Patent No.: US 8,255,663 B2
(45) Date of Patent: Aug. 28, 2012

(54) SYSTEM AND METHOD FOR PROCESSING READ REQUEST

(76) Inventors: Yookun Cho, Seoul (KR); Sang Lyul Min, Seoul (KR); Sung-Kwan Kim, Seoul (KR); Joosun Hahn, Seoul (KR); Jin Hyuk Yoon, Seoul (KR)

( * ) Notice: Subject to any disclaimer, the term of this patent is extended or adjusted under 35 U.S.C. 154(b) by 348 days.

(21) Appl. No.: 12/525,543

(22) PCT Filed: Jan. 24, 2008

(86) PCT No.: PCT/KR2008/000430
§ 371 (c)(1),
(2), (4) Date: Oct. 25, 2009

(87) PCT Pub. No.: WO2008/093961
PCT Pub. Date: Aug. 7, 2008

(65) Prior Publication Data
US 2010/0115190 A1 May 6, 2010

(30) Foreign Application Priority Data
Feb. 2, 2007 (KR) .................. 10-2007-0011249

(51) Int. Cl.
*G06F 12/00* (2006.01)
(52) U.S. Cl. ...................................... 711/202; 711/103
(58) Field of Classification Search .................. 711/202, 711/103
See application file for complete search history.

(56) References Cited

U.S. PATENT DOCUMENTS

| | | | | |
|---|---|---|---|---|
| 5,740,396 A * | 4/1998 | Mason | | 711/103 |
| 6,377,500 B1 * | 4/2002 | Fujimoto et al. | | 365/230.01 |
| 6,418,506 B1 * | 7/2002 | Pashley et al. | | 711/103 |
| 2004/0065744 A1 * | 4/2004 | Shiraishi et al. | | 235/492 |
| 2004/0186946 A1 * | 9/2004 | Lee | | 711/103 |
| 2006/0004971 A1 * | 1/2006 | Kim et al. | | 711/154 |
| 2006/0212674 A1 * | 9/2006 | Chung et al. | | 711/202 |
| 2007/0028035 A1 * | 2/2007 | Nishihara | | 711/103 |
| 2007/0294496 A1 * | 12/2007 | Goss et al. | | 711/163 |

FOREIGN PATENT DOCUMENTS

| | | |
|---|---|---|
| JP | 2005-209058 | 8/2005 |
| KR | 10-2004-0042478 | 5/2004 |
| KR | 10-2005-0076274 | 7/2005 |
| KR | 10-2006-0113248 | 11/2006 |
| WO | 2005/069288 | 7/2005 |

* cited by examiner

*Primary Examiner* — Hashem Farrokh (57) ABSTRACT

A system for processing a read request for maximizing host read performance in a flash memory-based storage device is provided. The system for processing the read request solves a bottleneck phenomenon caused by a processor by adding an independent automatic read request processor, different from a conventional system in which a processor of a storage device processes the read request. Also, when processing the read request, a storage device using a write buffer may control a process of merging data of the write buffer and a flash memory and transmitting the data to a host based on a descriptor array, thereby minimizing processor overhead.

15 Claims, 9 Drawing Sheets

SYSTEM AND METHOD FOR PROCESSING READ REQUEST

TECHNICAL FIELD

The present invention relates to a system for processing a host read request for a storage device, and more particularly, to a structure of a system for processing a read request in a flash memory-based storage device system.

BACKGROUND ART

A general storage device system includes a host interface to follow a widely-used storage device protocol, such as an Advanced Technology Attachment (ATA) protocol and a Small Computer System Interface (SCSI) protocol, non-volatile recording media including a disk, a flash memory, and the like, a controller to control the non-volatile recording media, a processor to manage the entire operation of the system, and a memory to store the code and data of the processor.

The flash memory is a non-volatile memory in which the stored data does not disappear and is maintained even when power is not supplied, and provides a function of electrically erasing and rewriting the whole or a part of a chip. In deletion of the data stored in the flash memory, deletion of all data on the chip and deletion of a block unit are possible, but deletion of a byte unit is impossible.

The flash memory is a semiconductor memory that electrically operates, consumes a small amount of power, is small, and is resistant to physical shock or vibration, when compared with existing storage media including a physical component, such as a disk. Due to these advantages, the flash memory is widely used for storage media of portable electronic devices including a digital camera, a portable multimedia player, a cellular phone, a personal digital assistant (PDA), and the like, or recording media of portable storage devices such as a Universal Serial Bus (USB) disk and a Multi Media Card (MMC) memory card. Also, currently, the flash memory attracts attention as a storage device of a general computer system due to high integration, a drop in price, and high performance by a multi-chip parallel processing scheme.

However, the flash memory may not support in-pace update, and has a limit that an erase operation performed in a unit that is greater than the unit of the write operation is required to be performed in advance. Also, the maximum number of erase operations is predefined for each block that is the unit of the erase operation. Also, since a performance gap between a read operation and a write operation is great, the read speed is very high while the write speed is relatively low.

Due to these limits, the logical address space seen by a host differs from the actual physical address space of the flash memory in a flash memory-based storage device, differently from a hard disk drive using, as the recording media, a magnetic disk that may support in-place update, and the like. Generally, when a host write operation is performed, even if a logical address is identical to the logical address previously used for writing, the write is performed in a different physical address in which an erase operation is already done, and when a host read operation is performed, a translation table being maintained for looking up a physical address in which data of a given logical address is actually located is used. A software layer in charge of such address translation of the flash memory-based storage device is referred to as a Flash Translation Layer (FTL).

The FTL may be generally classified into a sector level translation scheme, in which translation is performed in a sector unit that is the unit of the read and write operation of the host interface, and a block level translation scheme, in which translation is performed in a block unit that is the unit of the erase operation of the flash memory, depending on the translation unit. However, only the size of a translation table varies depending on whether the translation unit is big or small, and still, the translation table is required to be maintained in the memory or the flash memory and referring to the translation table is essential for the read operation.

In addition to the basic address translation, functions performed in the FTL include garbage collection, wear leveling, and the like. The garbage collection is performed for collecting physical sectors having become invalid through a host write operation in the corresponding logical address and restoring them to be writable ones by performing the erase operation. The wear leveling is performed for increasing the life of the entire storage device by balancing the number of times each erase unit is erased.

Figure 1:
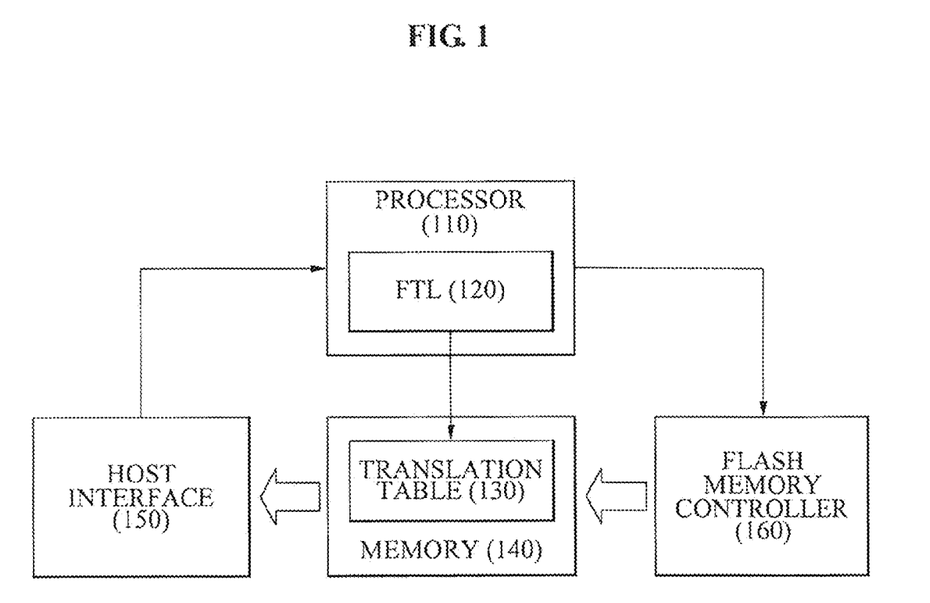
FIG. 1 is a diagram illustrating a configuration of a flash memory-based storage device according to a conventional art.

FIG. 1 is a diagram illustrating a configuration of a flash memory-based storage device according to a conventional art.

As illustrated in FIG. 1, a general flash memory-based storage device includes a host interface 150, a flash memory controller 160, a processor 110, a memory 140, and FTL software 120. When a read operation is processed, the FTL 120 executed in a processor receives a host request including a start sector address and the number of sectors, transforms the host request into a flash memory request including a block number, a sector number in a block, and the number of sectors via reference to a translation table 130 that is maintained in the memory 140 (or in which only a necessary portion of the table is read into the memory 140 when the translation table is maintained in the flash memory), and operates the flash memory controller 160. The data read from the flash memory is transmitted to the host interface 150 via the memory 140 or directly through the First-In First-Out (FIFO).

Also, in the flash memory-based storage devices, the memory is used not only as storage means for storing the code and data of the processor and the translation table of the FTL, but also as a write buffer for improving host write performance. Generally, the low write performance comes from the characteristics of the flash memory that a write operation is slower than a read operation and an erase operation is performed prior to the write operation. When the write buffer is used, however, processing completion is first reported to a host after completing data transmission, and then the actual write operation to the flash memory is performed in the background with hiding the low flash memory write performance. In this case, some data required for processing a read request may exist in the write buffer. Since the data in the write buffer is more up-to-date than the data in the flash memory, the data in the write buffer is required to be transmitted to the host.

In the conventional systems, the processor is fully involved in the host read request processing and the data merging for the write buffer and the flash memory, which is the main cause of the low read performance. In the storage device systems, however, the processor usually operates at a relatively low speed, compared with exclusive logical circuits including a data transmission path, a host interface, a recording media controller, and the like, and hence is a bottleneck that limits host read performance. Also, since the processor necessarily performs other functions of the FTL, that is, management functions including garbage collection, wear leveling, and the like, the processing of a read request may not immediately start when the read request is received while the processor performs these functions, resulting in a significant increase in the processing time. Moreover, in the conventional flash memory-based storage devices using the write buffer, since the processor is in charge of merging the data existing in the write buffer with the data in the flash memory on a sector basis, the amount of operations of the processor increases, and the read performance is more degraded.

Accordingly, a system for processing a read request that allows the processing of a read request of a host interface for a flash memory without the direct intervention of a processor and allows data merging when the data is fragmented in a write buffer is disclosed in the present invention.

DISCLOSURE OF INVENTION

Technical Goals

The present invention provides a system and method for processing a read request which can process a read request for a flash memory independent of a processor.

The present invention also provides a system and method for processing a read request which can quickly process a read request regardless of the status of a processor when the read request processing for a flash memory is performed.

The present invention also provides a system and method for processing a read request which can share a translation table with a processor and maintain synchronization of the translation table.

The present invention also provides a system and method for processing a read request which can merge data and process the read request when the data is distributed and stored in a flash memory and a write buffer.

The present invention also provides a system and method for processing a read request which can get data distributed in a flash memory and a write buffer with a single read request using a descriptor array.

Technical Solutions

According to an aspect of the present invention, there is provided a system for processing a read request, the system including: a read request receiving unit to receive the read request including logical address information from a host interface; a physical address validity determining unit to determine, based on a logical address included in the logical address information, whether a physical address corresponding to the logical address is valid in a translation table via reference to the translation table; a physical address receiving unit to receive the physical address corresponding to the logical address via reference to the translation table when the physical address corresponding to the logical address is valid in the translation table; and a read request unit to request data corresponding to the physical address to be read from a flash memory, wherein the system operates independent of a processor.

According to another aspect of the present invention, there is provided a system for processing a read request, the system including: a descriptor array receiving unit to receive, from a processor, a descriptor array including at least one descriptor including logical sector information; a read request unit to request data of a logical sector corresponding to the logical sector information of each descriptor to be read from a flash memory or from a write buffer via reference to the at least one descriptor included in the descriptor array; and a data merge unit to merge the data read from the flash memory or from the write buffer based on the sequence of the descriptor array, wherein the system operates independent of a processor.

According to still another aspect of the present invention, there is provided a method of processing a read request, the method including: receiving the read request including logical address information from a host interface; determining, based on a logical address included in the logical address information, whether a physical address corresponding to the logical address is valid in a translation table via reference to the translation table; receiving the physical address corresponding to the logical address via reference to the translation table when the physical address corresponding to the logical address is valid in the translation table; and requesting data corresponding to the physical address to be read from a flash memory.

According to yet another aspect of the present invention, there is provided a method of processing a read request, the method including: receiving, from a processor, a descriptor array including at least one descriptor including logical sector information; requesting data corresponding to the logical sector information of each descriptor to be read from a flash memory or a write buffer via reference to the at least one descriptor included in the descriptor array; and merging the data read from the flash memory or from the write buffer based on the sequence of the descriptor array.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
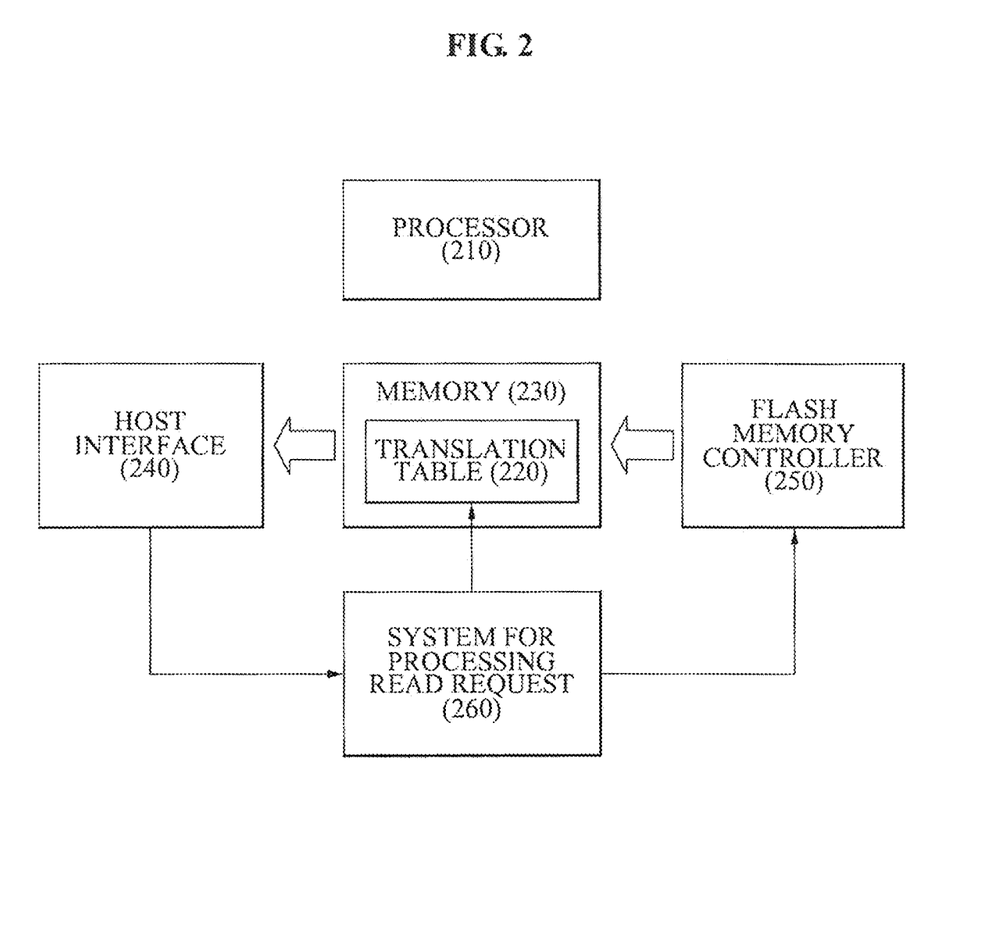
FIG. 2 is a diagram illustrating a configuration of a flash memory-based storage device including a system for processing a read request according to an exemplary embodiment of the present invention.

FIG. 2 is a diagram illustrating a configuration of a flash memory-based storage device including a system 260 for processing a read request according to an exemplary embodiment of the present invention.

In FIG. 2, the system 260 for processing the read request operates independent of a processor 210 in response to a signal of a host interface 240, accesses a translation table 220 based on host request information transmitted by the host interface 240, generates a read request for a flash memory controller 250, and starts the operation of the flash memory controller 250. Data read from a flash memory is transmitted to the host interface 240 via a memory 230 (or directly through the First-In First-Out (FIFO)), and the host interface 240 transmits the data to a host according to a host transmission protocol. In this instance, the processor 210 may perform other functions of a Flash Translation Layer (FTL) regardless of the processed read request.

When a host request is received, the system 260 for processing the read request sends a non-blocking interrupt to the processor 210 and reports that the processing of the request starts. When an error such as an invalid logical address occurs, the system 260 for processing the read request reports the cause of the error to the processor 210 via a status register. When the system 260 starts, the processor 210 sets necessary information including the address of the translation table 220, the size of the entire logical address space, and the like, in the system 260 for processing the read request. This operation is performed once when the system 260 starts.

Table 1 illustrates one possible format of the control and status registers of the system 260 for processing the read request. The enable flag sets the system 260 for processing the read request to be activated. Each flag of the status register indicates whether to be processed successfully and the cause of the error when an error occurs.

TABLE 1

| 31 | TRANSLATION TABLE START ADDRESS | | 0 |
|---|---|---|---|
| enable | | 15 SIZE OF TRANSLATION ENTRY | 0 |
| 31 | SIZE OF VALID LOGICAL ADDRESS SPACE | | 0 |

| | | | | | 3 | 2 | 1 | 0 |
|---|---|---|---|---|---|---|---|---|

PROCESSED NORMALLY
SYSTEM INACTIVATED
INVALID LOGICAL ADDRESS
INVALID PHYSICAL ADDRESS

When performing management functions including garbage collection, wear leveling, and the like, the processor 210 may update a portion of the translation table 220 that is subject to operation. In this instance, when a host read request is received and the portion of the translation table 220 under change is referred to, a problem that an erroneous flash memory read request is generated using the previous translation value having been already invalid may occur. For preventing this, each entry of the translation table 220 may has a flag indicating whether the current corresponding entry is invalid, and may set the flag so that the system 260 for processing the read request may not operate using the entry.

Table 2 denotes one possible format of the table entry. In this example, the FTL uses a block level translation scheme, and each entry represents an address of a physical block mapping to a logical block, and the most significant bit is used as the flag indicating whether the physical address is invalid. When this bit is set, the system for processing the read request sets an 'invalid physical address' error bit in the status register and automatically stops processing.

TABLE 2

| | 30 | | 0 |
|---|---|---|---|
| invalid | | PHYSICAL FLASH BLOCK ADDRESS | |

Figure 3:
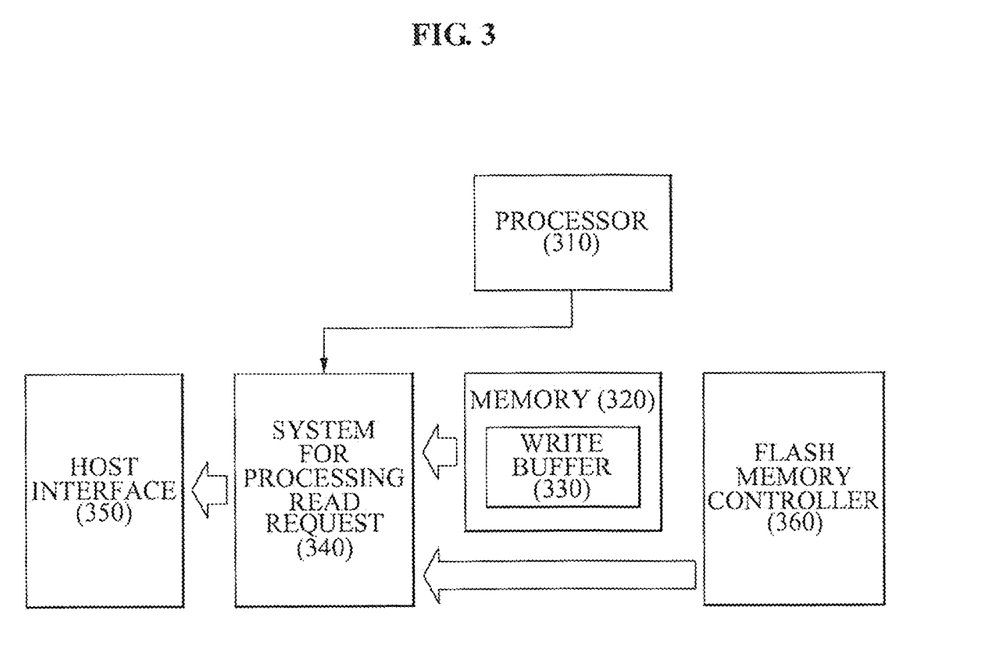
FIG. 3 is a diagram illustrating a configuration of a flash memory-based storage device including a system for processing a read request according to another exemplary embodiment of the present invention.

FIG. 3 is a diagram illustrating a configuration of a flash memory-based storage device including a system 340 for processing a read request according to another exemplary embodiment of the present invention.

A host interface 350 sends an interrupt to a processor 310 reporting that the host read request processing starts, and the processor 310 generates a flash memory read request and operates a flash memory controller 360. The processor 310 subsequently searches a write buffer 330 and determines whether a sector included in the currently processed read request exists. Also, the system 340 for processing the read request transmits, to the host interface 350, the data read from the write buffer 330 with respect to sectors existing in the write buffer 330, and the data read from the flash memory controller 360 with respect to sectors not existing in the write buffer 330.

In order to process the above-described operation efficiently, the system 340 for processing the read request has a capability of processing a single read request in a single operation based on a descriptor array. The processor 310 generates descriptors for each sector section consecutively located in the write buffer 330, and, excepting those sector sections, generates descriptors for remaining sector sections to be read from the flash memory. When the descriptor array for the entire read request is composed, the start address of the descriptor array is set in the system 340 for processing the read request and the system 340 for processing the read request operates. The system 340 for processing the read request sequentially processes each sector section according to the descriptions of the descriptor array. When a descriptor array generation is completed and the system 340 for processing the read request operates, the function of the processor 310 ends and the processor 310 may be used for other operation processing.

Table 3 illustrates one possible format of the descriptor that indicates the operations of the system 340 for processing the read request. Each descriptor shows that the data is read from the given data source, that is, either of the write buffer 330 or the flash memory controller 360, with respect to a given number of consecutive sectors, and when the data is read from the write buffer 330, each descriptor includes an address in the write buffer 330 in which the corresponding sector is located. The End of Address (EOA) flag indicates the end of the descriptor array. A flag concerning whether to discard the data of the flash memory indicates whether to discard the data read from the flash memory controller 360 as much as the given number of sectors when the data are read from the write buffer 330.

TABLE 3

DATA SOURCE
→ 0 WRITE BUFFER, 1 FLASH MEMORY
WHETHER TO DISCARD DATA OF FLASH MEMORY
→ 0 HOLD, 1 DISCARD

| EOA | | | | 15 | NUMBER OF SECTORS | 0 |
|---|---|---|---|---|---|---|
| 31 | | | WRITE BUFFER ADDRESS | | | 0 |

Figure 4:
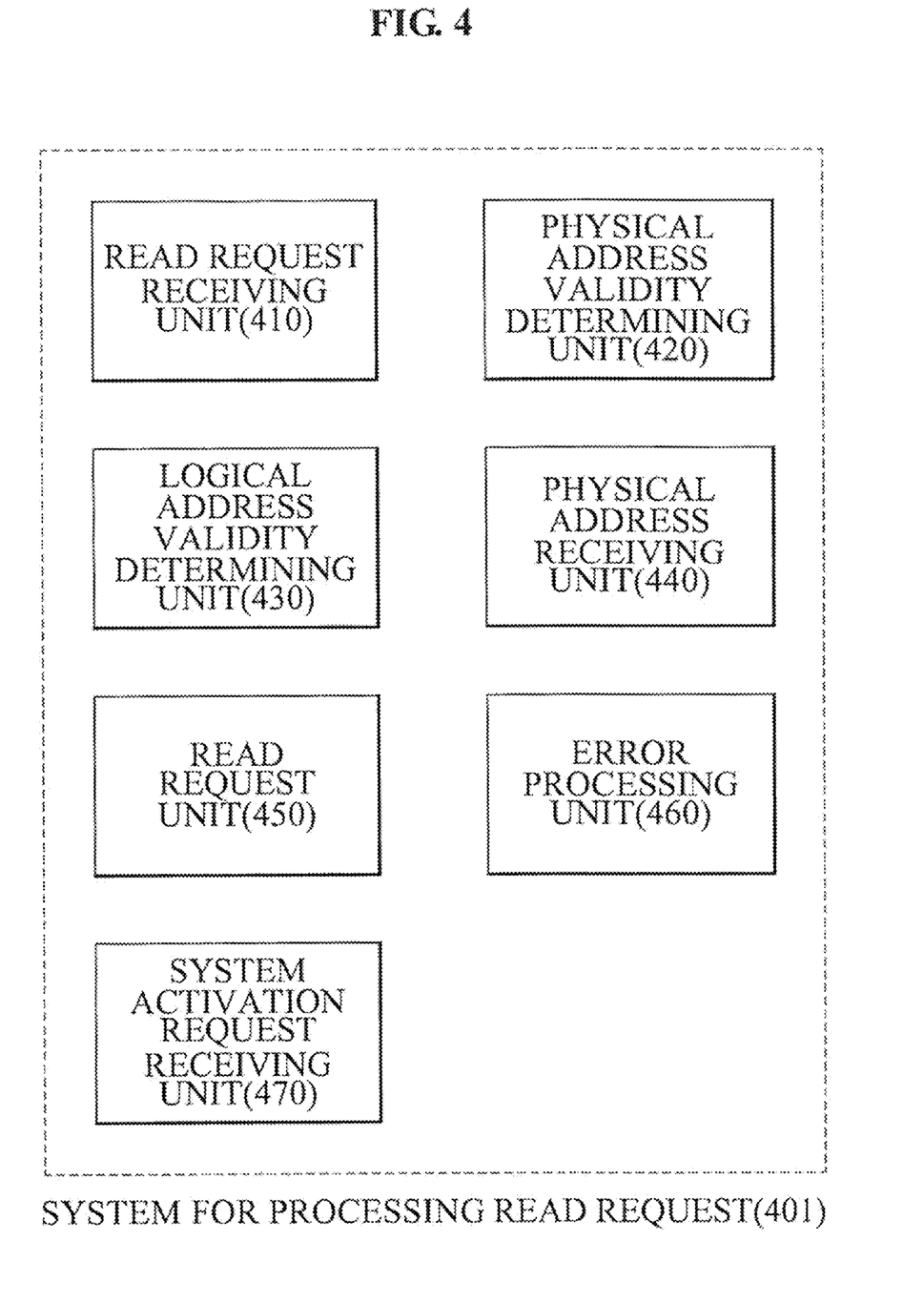
FIG. 4 is a block diagram illustrating an internal configuration of a system for processing a read request according to an exemplary embodiment of the present invention.

FIG. 4 is a block diagram illustrating an internal configuration of a system 401 for processing a read request according to an exemplary embodiment of the present invention.

As illustrated in FIG. 4, the system 401 for processing the read request according to the present exemplary embodiment of the present invention includes a read request receiving unit 410, a physical address validity determining unit 420, a logical address validity determining unit 430, a physical address receiving unit 440, a read request unit 450, an error processing unit 460, and a system activation request receiving unit 470. The above-described units may be embodied as software, hardware, or in a form of combining software and hardware, and may be connected in a form of being communicable with each other. Hereinafter, each unit is described in detail.

The read request receiving unit 410 receives the read request including logical address information from a host interface. The logical address information may be a logical address itself pointing to the data stored in the flash memory, and may be information including further information other than a logical address, and may be information used to generate a logical address.

Also, when the read request receiving unit 410 receives the read request, the read request receiving unit 410 may report to a processor that the read request is received, and make the processor to notice in real time that the read request is received by sending a non-blocking interrupt. Accordingly, the processor may notice whether the read request receiving unit 410 starts the processing of the read request.

The physical address validity determining unit 420 determines, based on a logical address included in the logical address information included in the read request received by the read request receiving unit 410, whether a physical address corresponding to the logical address is valid in a translation table via reference to the translation table. The system 401 for processing the read request operates independent of the processor. Accordingly, when the processor performs an operation other than the read request processing and the operation requires changing the translation table, a problem may occur since the change of the translation table is not synchronized in the system 401 for processing the read request. In order to prevent this, when the translation table is changed in a main memory, the physical address in the translation table may be set to be invalid. For this purpose, a flag indicating whether the physical address is valid may be included in physical address information stored in the translation table.

The logical address validity determining unit 430 determines whether the logical address included in the logical address information received from the read request receiving unit 410 is valid. This is needed for performing error processing when an invalid logical address is received.

The physical address receiving unit 440 receives the physical address corresponding to the logical address via reference to the translation table when the physical address corresponding to the logical address included in the logical address information received from the read request receiving unit 410 is valid in the translation table. In the flash memory, the physical address is generally different from the logical address, and an address in which data is actually stored is referred to as the physical address, and an address used for identifying the data in the system is referred to as the logical address. Accordingly, the physical address in which data is actually stored is required to be obtained in order to read the data, and the physical address receiving unit 440 performs this function.

The read request unit 450 requests data corresponding to the physical address received by the physical address receiving unit 440 to be read from the flash memory. The request may be transmitted to a module for reading and writing the data in the flash memory, and the module actually reads the data located in the physical address of the flash memory using the physical address. The read data may be transmitted to the host interface.

The error processing unit 460 transmits error information to the processor when the physical address corresponding to the logical address is invalid in the translation table, or the logical address is invalid. The error information is stored in a register that is accessible by the processor and is checked by the processor. Also, when an error occurs in the system 401 for processing the read request, the error processing unit 460 reports this to the processor, thereby allowing the processor to appropriately cope with the error.

The system activation request receiving unit 470 receives a system activating request from the processor. The system activating request is a request of enabling the system 401 for processing the read request to start an operation, and the system 401 for processing the read request may stay in a waiting state without performing any operation before the request is received. Also, the system activating request may include the start address of the translation table used in the system 401 for processing the read request, and may include other various information necessary for a system operation such as available logical address space and the like, thereby enabling the system 401 for processing the read request to start the normal operation.

Figure 5:
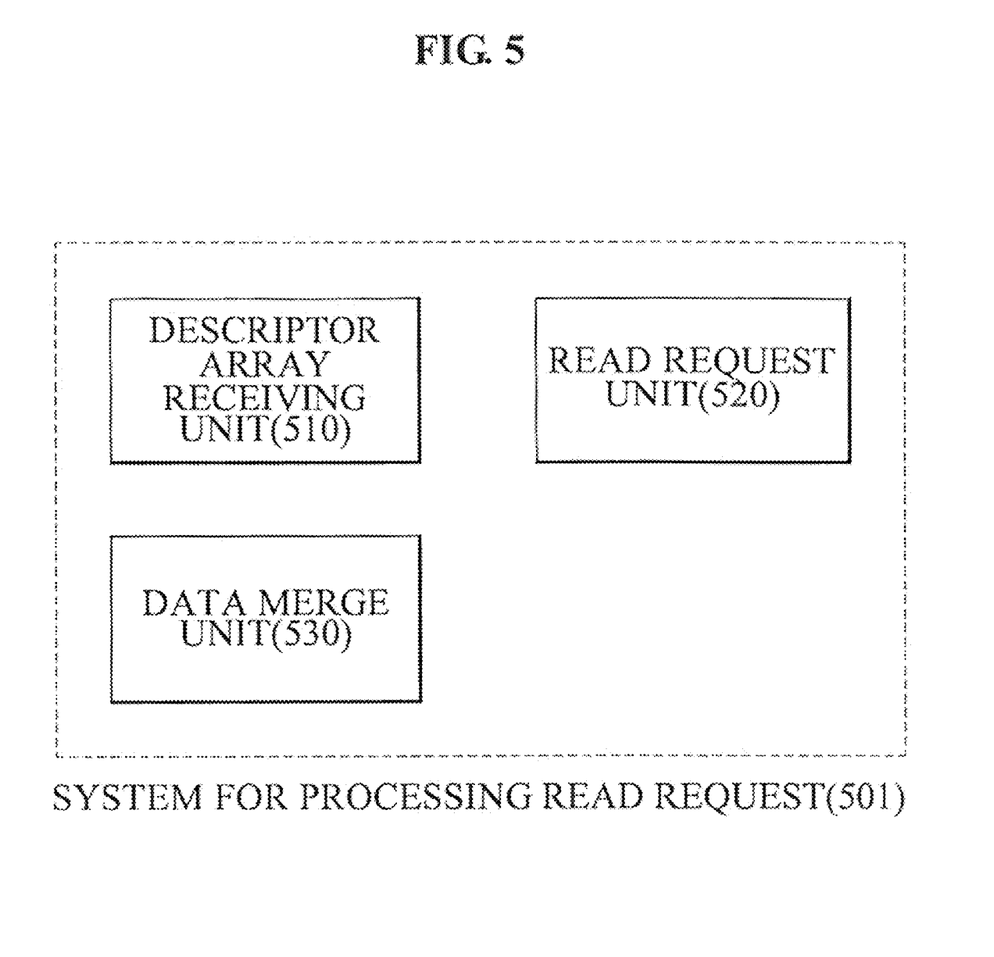
FIG. 5 is a block diagram illustrating an internal configuration of a system for processing a read request according to another exemplary embodiment of the present invention.

FIG. 5 is a block diagram illustrating an internal configuration of a system 501 for processing a read request according to another exemplary embodiment of the present invention.

As illustrated in FIG. 5, the system 501 for processing the read request according to the present exemplary embodiment of the present invention includes a descriptor array receiving unit 510, a read request unit 520, and a data merge unit 530. The above-described units may be embodied as software, hardware, or in a form of combining software and hardware, and may be connected in a for of being communicable with each other. Hereinafter, each unit is described in detail.

The descriptor array receiving unit 510 receives, from a processor, a descriptor array including at least one descriptor including logical sector information. The descriptor array is generated by the processor, and the descriptor array receiving unit 510 may receive the descriptor array directly from the processor via a bus, a network, and the like, and may also receive the descriptor array by reading a memory when the processor stores the descriptor array in the memory.

The at least one descriptor includes information on whether data of the logical sector corresponding to the logical sector information of the at least one descriptor is stored in the flash memory or in the write buffer. Accordingly, the system 501 for processing the read request may read the data stored in a write buffer and the data stored in a flash memory, respectively, and merge them into one. Also, the at least one descriptor includes information on whether to use data read from the flash memory when the data of the logical sector corresponding to the logical sector information of the at least one descriptor is stored in the write buffer. Accordingly, data read from the flash memory may not be used and discarded if the data exists in the write buffer.

The read request unit 520 requests data of a logical sector corresponding to the logical sector information of each descriptor to be read from the flash memory or from the write buffer via reference to the at least one descriptor included in the descriptor array. The data may be read from the write buffer directly or using a separate module, and the data may be requested to be read from the flash memory using a separate module for reading and writing the data in the flash memory. In this instance, the separate module may read the data from the flash memory in advance, store the data in a storage device such as an FIFO buffer and the like, and enable the system 501 for processing the read request to read the data stored in the storage device in response to the request.

The data merge unit 530 merges the data read from the flash memory or from the write buffer based on the sequence of the descriptor array. Accordingly, when the data is distributed in the flash memory and the write buffer, the data merge unit 530 merges and provides the merged data, thereby allowing the host interface and the processor to simply get the merged data.

Figure 6:
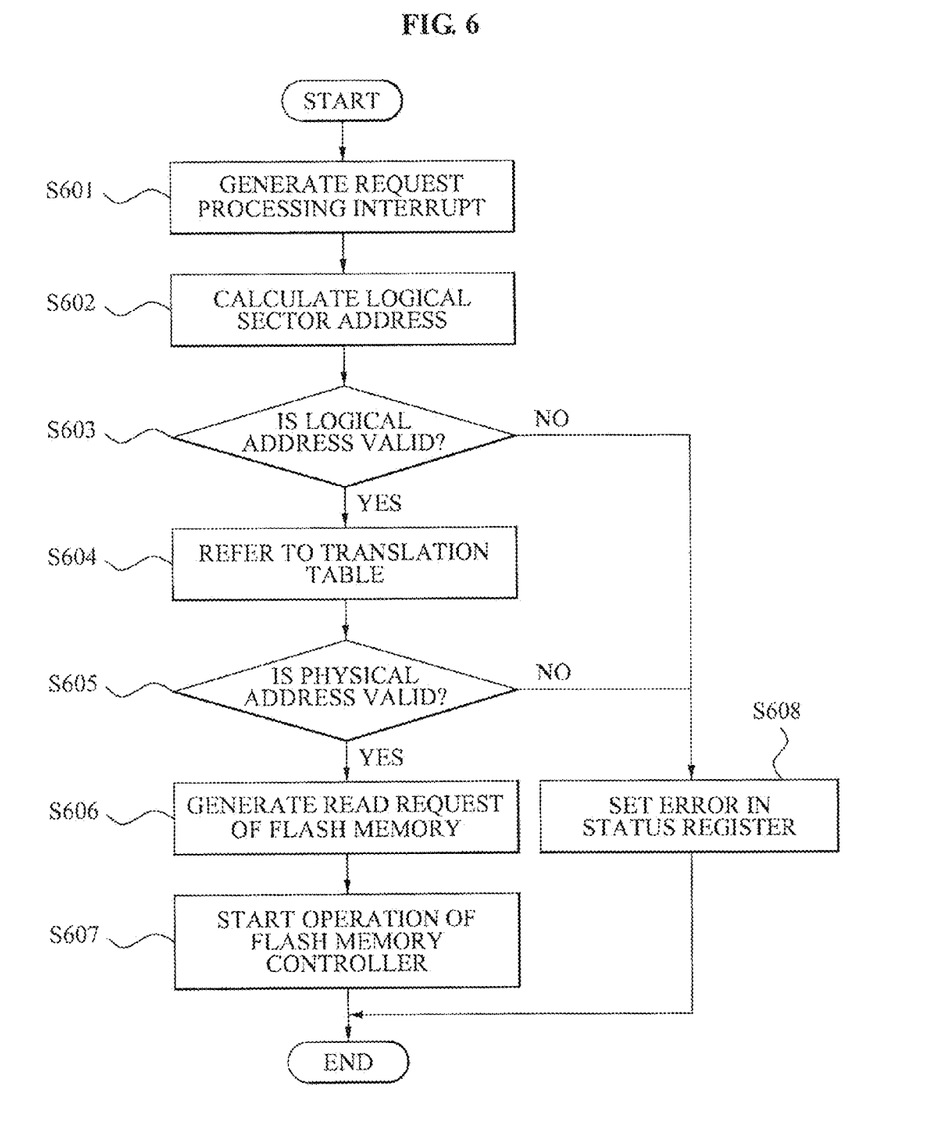
FIG. 6 is a flowchart illustrating a method of processing a read request according to an exemplary embodiment of the present invention.

FIG. 6 is a flowchart illustrating a method of processing a read request according to an exemplary embodiment of the present invention.

In operation S601, when a host read request is received, an operation of a system for processing a read request starts and the parameter of the read request is transmitted from a host interface. When the request parameter is not received in the form of a logical sector address, conversion into a logical sector address may be required. For example, in the case of an Advanced Technology Attachment (ATA) protocol, the start sector parameter may be received in the form of a cylinder, a head, and a sector number. In this case, the parameter is converted into a linear logical sector address using the current setting values of the number of heads and the number of sectors for each cylinder in operation S602. Since processing cannot continue when the logical sector address received as the parameter or converted from the parameter is outside a valid range, a corresponding error flag is set in a status register and the processing ends in operation S608.

When the valid logical sector address is provided in operation S603, a translation table entry address corresponding to an actual logical address is calculated using the translation table start address and the table entry size being set during initialization, and a physical address located in the translation table entry address is read in operation S604. In operation S608, when a flag for indicating the invalid physical address is examined and is invalid, a corresponding error flag is set in the status register and the processing is completed.

In case of a valid physical address is provided in operation S605, a read request of a form defined in a flash memory controller is generated in operation S606. Table 4 illustrates one possible flash memory controller request form. In the exemplary embodiment, a single flash memory read request includes information on a physical flash memory block number, a start sector number in a block, and the number of sectors to be read. In operation S607, a controller operation is started after setting the generated flash memory read request in the controller.

TABLE 4

| 31 | | 0 |
|---|---|---|
| | OP CODES | |
| 31 | | 0 |
| | PHYSICAL BLOCK ADDRESS | |
| 31 | 16 \| 15 | 0 |
| NUMBER OF SECTORS | START SECTOR NUMBER IN BLOCK | |

When the system for processing the read request may not perform a normal operation due to the above-described reasons, a processor needs to operate in a predefined manner, and analyze the cause of the error and perform appropriate error processing. When an entry of a translation table is temporarily invalid, an operation of waiting for the completion of the entry change and re-issuing the flash memory controller request is required. When the host request is a read with respect to an invalid logical sector, reporting an error to a host is required.

Figure 7:
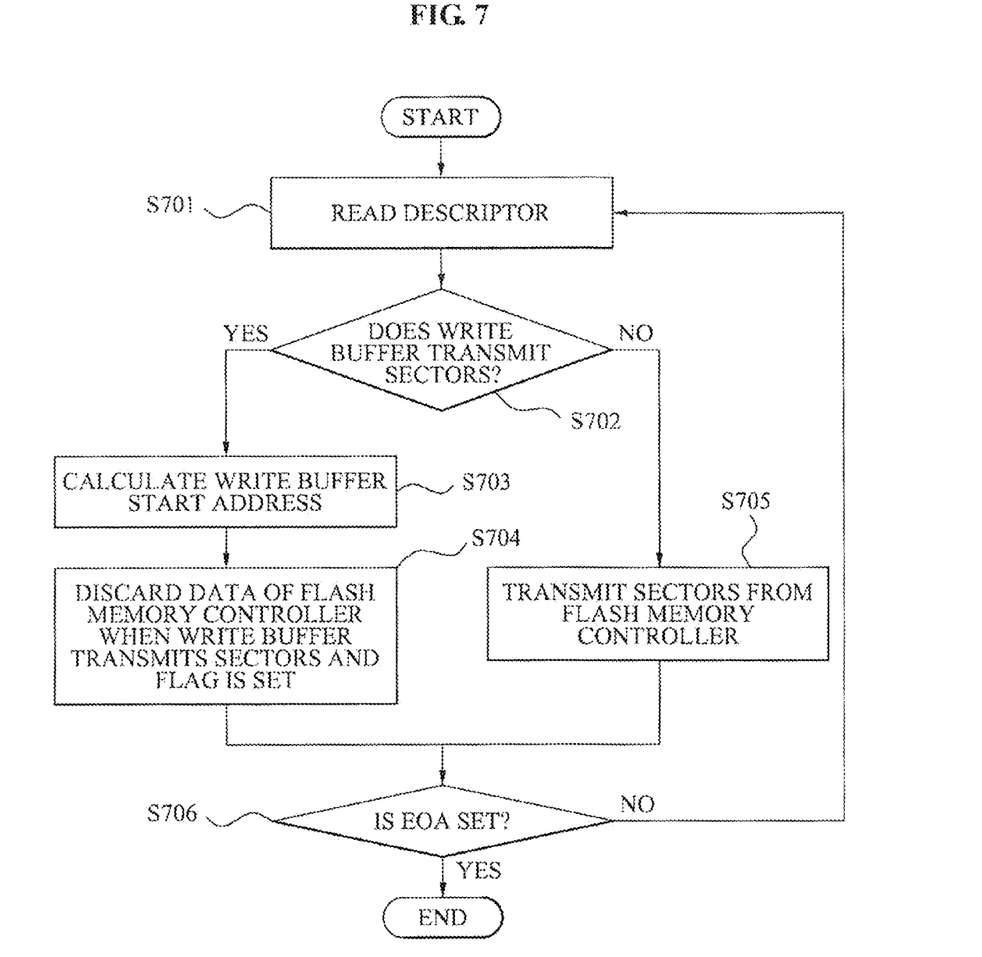
FIG. 7 is a flowchart illustrating a method of processing a read request according to another exemplary embodiment of the present invention.

FIG. 7 is a flowchart illustrating a method of processing a read request according to another exemplary embodiment of the present invention.

In operation S701, when an operation of a system for processing a read request starts, the first descriptor of a descriptor array is read in the predetermined start address of the descriptor array. In operation S702, the source from which sectors are required to be read is determined. In operation S705, when the sectors are required to be read from a flash memory controller, as many sectors as the number of sectors set in the descriptor are transmitted from the flash memory controller FIFO. In operation S704, when the sectors are required to be read form a write buffer, the flash memory controller FIFO must release the same amount of sectors. In operation S706, when the processing of a single descriptor is completed, the flag indicating the end of the descriptor array (EOA) is examined, and when the flag is not set, the above process is repeated for the subsequent descriptors.

Figure 8:
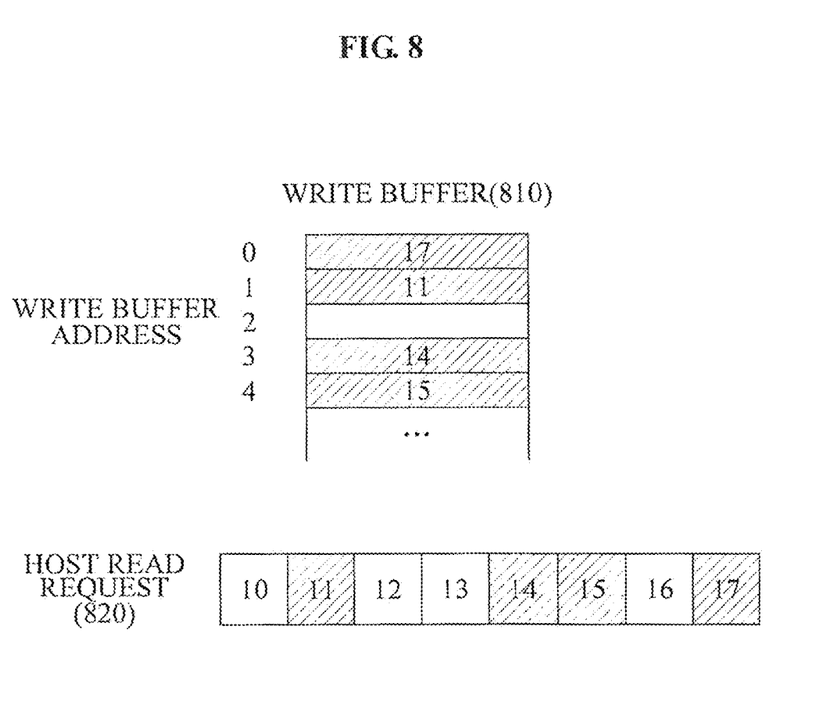
FIG. 8 illustrates an example of the host read request processing when a system for processing a read request uses a write buffer according to an exemplary embodiment of the present invention.

FIG. 8 illustrates an example of the processing of a host read request 820 when a system for processing a read request uses a write buffer according to an exemplary embodiment of the present invention.

In this example, a host attempts to read the 10-th to the 17-th logical sectors, and, among those, the 11-th, the 14-th, the 15-th, and the 17-th logical sectors exist in a write buffer 810. In this case, two methods are possible for processing the read request 820. The first method is a method of not providing the read request to a flash memory controller with respect to sectors stored in the write buffer 810, and dividing the request into three requests corresponding to section <10>, section <12, 13>, and section <16>, and the second method is a method of not using and discarding the data read from the flash memory controller with respect to section <11>, section <14, 15>, and section <17> to be transmitted from the write buffer 810 after the flash memory read request is provided with respect to the entire section <10 to 17>. Since the processing overhead of the former to generate several flash memory read requests is more severe than the processing overhead of the latter, the present exemplary embodiment may use the method of the latter, however, the method of the former may be also applied to the present invention, and the present invention is not limited thereto. For this purpose, a flag indicating whether to discard the data of the flash memory is used in a descriptor. When the flag is set to 1, the data read from the flash memory is discarded as much as the number of sectors set in the descriptor.

Figure 9:
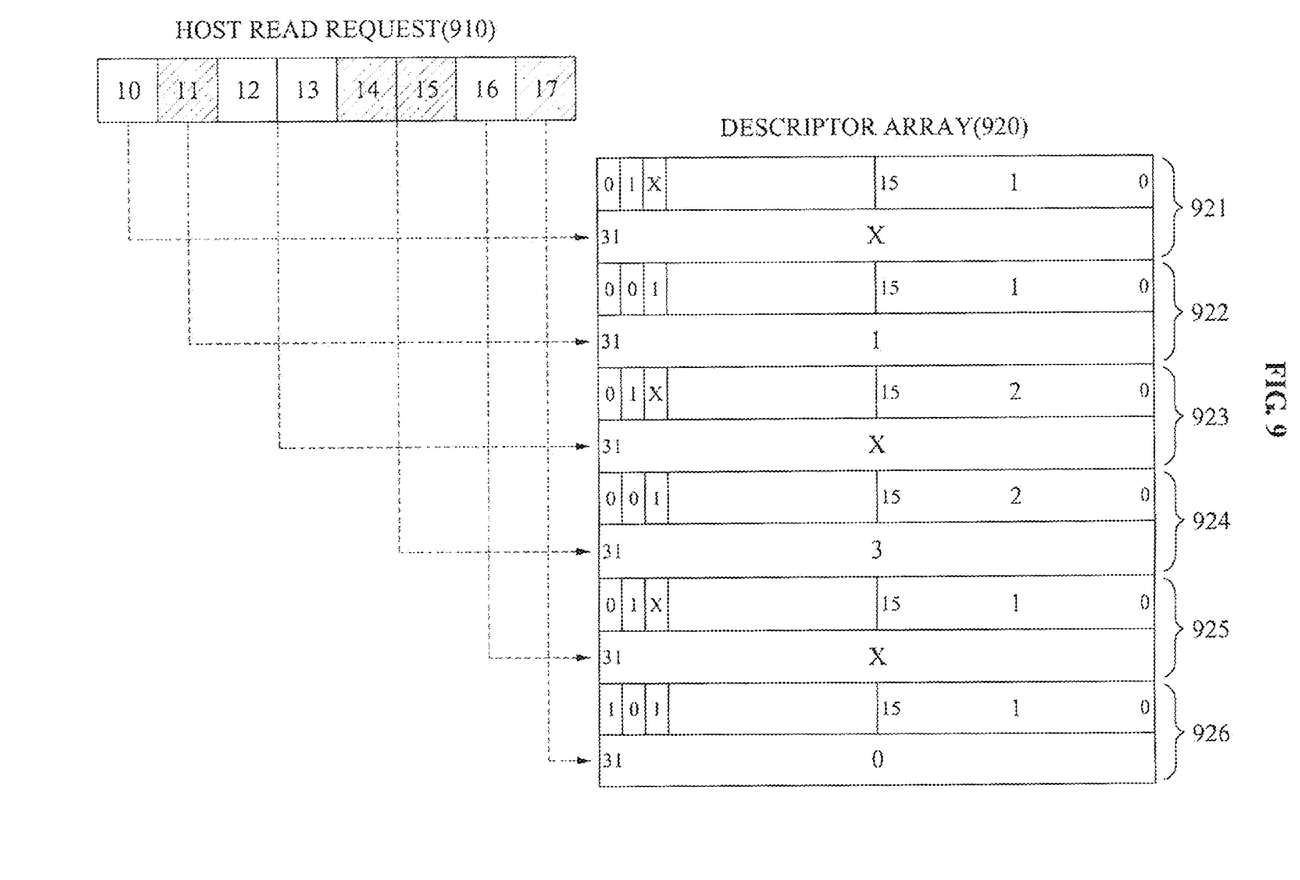
FIG. 9 illustrates an example of a descriptor array corresponding to a host read request in a system for processing a read request according to an exemplary embodiment of the present invention.

FIG. 9 illustrates a descriptor array 920 corresponding to a host read request 910 in a system for processing a read request according to an exemplary embodiment of the present invention. In FIG. 9, the read request is divided into a total of six sections (reference numbers 921 through 926), and three sections (reference numbers 921, 923, and 925) are set to be read from a flash memory, and the remaining three sections (reference numbers 922, 924, and 926) are set to be read from a write buffer. The descriptor illustrated in FIG. 9 is similar to the descriptor exemplified in Table 3.

The system for processing the read request according to the exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, it is possible to process a read request for a flash memory independent of a processor.

Also, according to the present invention, it is possible to quickly process a read request regardless of the status of a processor when the read request processing for a flash memory is performed.

Also, according to the present invention, it is possible to share a translation table with a processor and maintain synchronization of the translation table.

Also, according to the present invention, it is possible to merge data and process the read request when the data is distributed and stored in a flash memory and a write buffer.

Also, according to the present invention, it is possible to get data distributed in a flash memory and a write buffer with a single read request using a descriptor array.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A system for processing a read request, the system comprising:
 a read request receiving unit to receive the read request including logical address information from a host interface;
 a physical address validity determining unit to determine, based on a logical address included in the logical address information, whether a physical address corresponding to the logical address is valid in a translation table via reference to the translation table;
 a physical address receiving unit to receive the physical address corresponding to the logical address via reference to the translation table when the physical address corresponding to the logical address is valid in the translation table;
 a read request unit to request data corresponding to the physical address to be read from a flash memory; and
 a system activation request receiving unit to receive a system activating request including an address of the translation table, from the processor,
 wherein the system operates independent of a processor,
 wherein the physical address in the translation table is set to be invalid while the translation table is being changed by performing an operation in the processor.

2. The system of claim 1, further comprising:
 a logical address validity determining unit to determine whether the logical address is valid.

3. The system of claim 2, further comprising:
 an error processing unit to transmit error information to the processor when the physical address corresponding to the logical address is invalid in the translation table, or the logical address is invalid.

4. The system of claim 3, wherein the error processing unit stores the error information in a register accessible by the processor.

5. The system of claim 1, wherein, when the read request is received, the read request receiving unit reports the read request processing start to the processor.

6. The system of claim 5, wherein the read request receiving unit generates an interrupt recognized by the processor and reports the read request processing start.

7. The system of claim 1, wherein the system activating request includes the size of the entire logical address space.

8. A system for processing a read request, the system comprising:
 a descriptor array receiving unit to receive, from a processor, a descriptor array including at least one descriptor including information on whether the data of the logical sector corresponding to the logical sector information of the at least one descriptor is stored in the flash memory or in the write buffer;
 a read request unit to request data of a logical sector corresponding to the logical sector information of each descriptor to be read from a flash memory or from a write buffer via reference to the at least one descriptor included in the descriptor array; and
 a data merge unit to merge the data read from the flash memory or from the write buffer based on the sequence of the descriptor array,
 wherein the system operates independent of a processor.

9. The system of claim 8, wherein the at least one descriptor includes information on whether to use the data read from the flash memory when the data of the logical sector corresponding to the logical sector information of the at least one descriptor is stored in the write buffer.

10. A method of processing a read request performed by a system for processing a read request, the method comprising:
 receiving the read request including logical address information from a host interface;
 determining, based on a logical address included in the logical address information, whether a physical address corresponding to the logical address is valid in a translation table via reference to the translation table;
 receiving the physical address corresponding to the logical address via reference to the translation table when the physical address corresponding to the logical address is valid in the translation table; and
 requesting data corresponding to the physical address to be read from a flash memory,
 a system activation request receiving unit to receive a system activating request including an address of the translation table, from a processor,
 wherein the system operates independent of the processor,
 wherein the physical address in the translation table is set to be invalid while the translation table is being changed by performing an operation in the processor.

11. The method of claim 10, further comprising:
 determining whether the logical address is valid.

12. The method of claim 11, further comprising:
transmitting error information to the processor when the physical address corresponding to the logical address is invalid in the translation table, or the logical address is invalid.

13. A non-transitory computer-readable recording medium storing a program for implementing the method according to claim 10.

14. A method of processing a read request, the method comprising:
receiving, from a processor, a descriptor array including at least one descriptor including information on whether the data of the logical sector corresponding to the logical sector information of the at least one descriptor is stored in the flash memory or in the write buffer;
requesting data corresponding to the logical sector information of each descriptor to be read from a flash memory or from a write buffer via reference to the at least one descriptor included in the descriptor array; and
merging the data read from the flash memory or from the write buffer based on the sequence of the descriptor array.

15. The method of claim 14, wherein the at least one descriptor includes information on whether to use the data read from the flash memory when the data of the logical sector corresponding to the logical sector information of the at least one descriptor is stored in the write buffer.

* * * * *